United States Patent
Isogawa et al.

[15] 3,678,132
[45] July 18, 1972

[54] VINYL CHLORIDE RESIN BLENDS

[72] Inventors: Masataka Isogawa, Osaka; Shoichi Minato; Zenjiro Ando, both of Kobe, all of Japan

[73] Assignee: Kanegafuchi Kogaku Kogyo Kabushiki Kaisha, Osaka, Japan

[22] Filed: Feb. 25, 1970

[21] Appl. No.: 14,181

[30] Foreign Application Priority Data

March 4, 1969 Japan.................................44/16344

[52] U.S. Cl. ...............260/876 R, 260/80.81, 260/85.5 X A, 260/86.3, 260/87.5 R, 260/87.5 C, 260/880 R
[51] Int. Cl........................................C08f 29/24, C08f 37/18
[58] Field of Search ..............................................260/876 R

[56] References Cited

UNITED STATES PATENTS 3,520,953  7/1970  Sugimoto et al........................260/890
3,463,833  8/1969  Isogawa................................260/876

*Primary Examiner*—Samuel H. Blech
*Assistant Examiner*—J. Seibert
*Attorney*—Moonray Kojima

[57] ABSTRACT

Thermoplastic resinous compositions comprising a blend of (1) 20 to 60 percent by weight of vinyl chloride resin and (2) 80 to 40 percent by weight of (A) 40 to 80 percent by weight of a resin prepared by copolymerizing 30 to 80 percent by weight of alpha methylstyrene, 5 to 50 percent by weight of methyl methacrylate, and 3 to 30 percent by weight of acrylonitrile; and (B) 60 to 20 percent by weight of a graft copolymer prepared by graft copolymerization of 65 to 35 percent by weight butadienic polymer and 35 to 65 percent by weight of a monomer mixture of 50 to 80 percent by weight of styrene, 20 to 50 percent by weight of methyl methacrylate, and 0 to 30 percent by weight of acrylonitrile.

8 Claims, No Drawings

VINYL CHLORIDE RESIN BLENDS

This invention relates to thermoplastic resinous compositions having a combination of excellent impact resistance, excellent heat resistance, and excellent molding property.

Numerous thermoplastic resins are now commercially available. However, almost all of the prior art resins lack the desired combination of desired properties. Some are deficient in either heat resistance or impact resistance or in both such mechanical property. Others have good heat resistance and impact resistance, but are poor in molding property.

Various ways have been proposed to overcome these difficulties, but mostly without success. Usually the improvements obtained are insufficient. For example, one of the thermoplastic resinous compositions in which the aforementioned properties are improved is disclosed in U.S. Pat. No. 3,463,833. The moldings, such as pipes and sheets prepared by extruding the resin composition have been found to leave something to be desired in impact strength and molding properties.

Therefore, an object of this invention is to provide an improved thermoplastic resinous composition having the combination of good molding property, high impact resistance, and high heat resistance.

The foregoing and other objects of this invention are attained in an illustrative embodiment which is a thermoplastic resinous composition comprising a uniform blend of (A) a resin prepared by copolymerizing a monomer mixture of 30 to 80 percent by weight of alpha methylstyrene, 5 to 50 percent by weight of methyl methacrylate, and 3 to 30 percent by weight of acrylonitrile; (B) a graft copolymer prepared by graft-copolymerizing unto 65 to 35 percent by weight of a butadienic polymer, 35 to 65 percent by weight of a monomer mixture of 50 to 80 percent by weight of styrene, 20 to 50 percent by weight of methyl methacrylate, and 0 to 30 percent by weight of acrylonitrile; and (C) a vinyl chloride resin. The proportion of components is 20 to 60 percent by weight of vinyl chloride resin and 80 to 40 percent by weight of the combination of (A) and (B). In the combination resin (A) is 40 to 80 percent by weight and graft copolymer (B) is 60 to 20 percent by weight.

The foregoing object, features and advantages of this invention will become more apparent from consideration of the below detailed description.

As discussed above, resin (A) is prepared by copolymerizing a monomer mixture of 30 to 80 percent by weight of alpha methylstyrene, 5 to 50 percent by weight of methyl methacrylate, and 3 to 30 percent by weight of acrylonitrile. The presence of acrylonitrile is important for increasing the toughness of the final resinous composition and for improving the polymerizability of the monomer mixture. If the proportion of acrylonitrile is less than 3 percent by weight, its effect becomes minimal. If the proportion is higher than 30 percent by weight, undesireable coloring and reduction in heat resistance of the final resinous composition, results.

Methyl methacrylate contributes to improvement of the toughness and the heat resistance of the final resinous composition. If the proportion of methyl methacrylate is lower than 5 percent by weight, its effect is less than desireable. If the proportion is higher than 50 percent by weight, the heat resistance of the final resinous composition is reduced. Also, when using an emulsion polymerization, the stability of the latex at the polymerization will also be reduced and consequently the tendency to cause creaming during polymerization becomes severe.

The alpha methylstyrene contributes to improvement of the heat resistance of the final resinous composition. If the proportion of alpha methylstyrene is lower than 30 percent by weight, its effects are less than desired. If the proportion is higher than 80 percent by weight, the final resinous composition will lack toughness. Also, when conducting the copolymerization by ordinary radical polymerization, the copolymerization becomes difficult.

The copolymerization may be conducted by bulk polymerization, suspension polymerization, or emulsion polymerization. In preparing copolymers having greater amounts of alpha methylstyrene, such copolymers being preferable for obtaining improved thermoplastic resinous copolymers of the present invention, better results are obtained by using emulsion polymerization.

Graft copolymer (B) is prepared by graft-copolymerization of 65 to 35 percent by weight of the aforementioned monomer mixture to 35 to 65 percent by weight of a butadienic polymer.

The term butadienic polymer includes homopolymers such as polybutadiene and copolymers of more than 50 percent by weight of butadiene and other monoolefinic monomers such as styrene, acrylonitrile, and methyl methacrylate. Moreover, in order to obtain the graft polymer most suitable for the thermoplastic resinous composition of this invention, it is preferable to use latex particles of which at least 80 percent by weight is larger than 0.1 microns.

The monomer mixture to be grafted to the butadienic polymer is obtained by mixing 50 to 80 percent by weight of styrene, 20 to 50 percent by weight of methyl methacrylate, and 0 to 30 percent by weight of acrylonitrile.

If the proportion of styrene is higher than 80 percent by weight the desired effects are not completely attained. Also, if it is lower than 50 percent by weight the molding property of the final resinous composition, is reduced. If the proportion of methyl methacrylate is higher than 50 percent by weight, the molding property of the final resinous composition is reduced, and the stability of the latex is reduced when the graft copolymerization is conducted by emulsion polymerization. If it is lower than 20 percent by weight the effects desired are not completely attained. Furthermore, if the proportion of acrylonitrile is higher than 30 percent by weight, the impact resistance of the final resinous composition is degraded and the stability of the latex is lowered when emulsion polymerization is employed.

Vinyl chloride resin (C) employed in the present invention is vinyl chloride homopolymers, such as polyvinyl chloride, and copolymers prepared by copolymerizing more than 50 percent by weight of vinyl chloride and at least one monoolefinic monomer, such as vinyl acetate, vinyl stearate, acrylic ester, methacrylic ester, styrene, acrylonitrile, ethylene, propylene and the like.

The final resinous composition is obtained by uniformly blending the aforementioned three components (A), (B) and (C). The mixing ratios of the components are (1) 20 to 60 percent by weight of vinyl chloride resin (C), and 80 to 40 percent by weight of the combined weights of (A) and (B). Of the combined weights, the resin (A) is 40 to 80 percent by weight and graft copolymer (B) is 60 to 20 percent by weight. The mixing may be done by such means as Banbury mixer, a mixing roll, extruder, etc. Also, a system in which the components are mixed in latex states, and then the latex mixture is solidified, may be employed.

As the content of vinyl chloride resin (C) in the resinous composition is increased, the heat resistance of the composition is reduced, and its extensibility at breaking and its molding property are increased. When the proportion of the vinyl chloride resin is 40 to 50 percent by weight, the impact resistance of the resinous becomes optimal; the impact resistance value is markedly higher than those of any component before mixing.

The final composition may also contain ordinary additives, such as coloring agent, heat stabilizer, light stabilizer, molding aid, etc.

Advantageously, the final thermoplastic resinous composition of this invention excels in heat resistance, impact resistance and molding properties. It is suitable for molding by injection molding and extrusion molding. It is suitable for use in plastic pipes and sheets formed by extrusion molding.

This invention is further illustrated by the following examples.

EXAMPLE 1.

Preparation of resin (A)

Into a reactor equipped with a stirrer, a reflux condenser, an inlet for nitrogen gas, a thermometer, and a dropping funnel, there were charged 250 parts by weight of water, 3.0 parts by weight of sodium oleate, 0.4 part by weight of sodium formaldehyde sulfoxylate di-hydrate, 0.0025 parts by weight of ferrous sulfate (7 $H_2O$), and 0.01 parts by weight of di-sodium ethylenediamine tetraacetate 2 $H_2O$). After purging oxygen from the system, the mixture was stirred at 60° C in a nitrogen stream. Thereafter, each of the monomer mixtures having the compositions shown below in Table 1, and having dissolved therein 0.3 parts by weight of cumene hydroperoxide and 0.3 part by weight of mixed tertiary mercaptans, was continuously added dropwise through the dropping funnel over a six hour period. After the monomer mixture was added, the resultant system was further stirred for one hour at 60° C. By blowing steam into the copolymer latex thus prepared, the unreacted monomers were removed and then the latex was coagulated by adding sodium chloride and hydrochloric acid and heated to aggregate the particles, which were collected by filtration, washed with water and dried to provide a powdered product.

Preparation of graft copolymer (B)

Into the same reactor system as used above, there were charged 84.7 parts by weight of a large grain butadiene rubber latex (JSR–0700 Latex made by Nippon Synthatic Rubber Co.) containing 50 parts by weight of solids and 215.3 parts by weight of water, 0.2 percent by weight of sodium formaldehyde sulfoxylate 2 $H_2O$), 0.0025 part by weight of ferrous sulfate 7 $H_2O$), and 0.01 part by weight of disodium ethylenediamine tetraacetate (2 $H_2O$). After purging oxygen from the reactor, the mixture was stirred at 60° C in a nitrogen stream. Thereafter, a monomer mixture (B–1) consisting of 25 parts by weight of styrene having dissolved therein 0.2 part by weight of cumene hydroperoxide and 0.1 part by weight of mixed tertiary mercaptans, 15 parts by weight of methyl methacrylate, and 10 parts by weight of acrylonitrile was continuously added dropwise to the system through the dropping funnel over a three hour period.

Thereafter, the resultant system was further stirred for one hour at 60° C. By blowing steam into the graft polymer latex thus formed, the unreacted monomers were removed. The latex was coagulated with sodium chloride and hydrochloric acid and heated to aggregate the particles thereof. The particles were recovered by filtration, washed with water and dried to provide the powdered product.

Preparation of final thermoplastic resinous composition

A mixture of 42 g. of resin (A) prepared above and having different components and labelled (A–1, A–2, A–3, A–4); 18 g. of graft polymer (B–1); and 40 g. of polyvinyl chloride having a polymerization degree of 1300 (as measured according to suitable JIS or Japanese Industrial Standard), was kneaded together with 1.2 g. of tribasic lead, 0.2 g. of lead stearate, 0.4 g. of barium stearate and 0.2 g. of calcium stearate, for 8 minutes on a roll mill, heated to 200° C, to provide a sheet of the resinous composition.

The sheet was pressed for 15 minutes at 180° C under a pressure of 100 kg./cm². The properties of the sheet are shown in Table 1.

TABLE 1

| Experiment No. | 1 | 2 | 3 | 4 |
|---|---|---|---|---|
| Composition of resin (A): | | | | |
| Alpha methylstyrene | 72 | 62 | 53 | 40 |
| Methyl methacrylate | 12 | 27 | 40 | 60 |
| Acrylonitrile | 16 | 11 | 7 | 0 |
| Designation | A–1 | A–2 | A–3 | A–4 |
| Isod impact value (kg. cm./cm.²)[a] (notched) (23° C.) | 39.5 | 35.6 | 24.9 | 4.2 |
| Tensile strength (kg./cm.²)[b] (yield point) (23° C.) | 487 | 497 | 513 | 487 |
| Extensibility (percent)[b] (breaking) | 22 | 14 | 13 | 6 |
| Heat distortion temp.[c] (° C.) with 18.6 kg./cm.² load | 100 | 96 | 94 | 91 |
| Molding property[d] | 5.8 | 5.7 | 4.3 | 3.8 |

NOTE.—Measurements: [a]ASTM (D256);[b]ASTM (D638); [c]ASTM (D648) [d]Koka-type flow value (10⁻² CC./sec.) (nozzle φ×10L, 200° C. 100 kg./cm.²).

As is evident from the above Table 1, the samples of Experiments 1-3 of the final resinous composition have excellent mechanical properties, in particular, excellent impact resistance and heat resistance. On the other hand, the control sample of Experiment No. 4, in which resin (A) contained no acrylonitrile is substantially inferior in impact resistance, heat resistance, and molding property and extensibility.

EXAMPLE 2

The latex of resin (A–3) before coagulation (prepared in Example 1) was mixed with the latex of the graft polymer (B–1) before coagulation (also prepared in Example 1) in a weight ratio of 7:3 as solids. The mixture was coagulated, heat treated, filtered, washed with water and dried to provide a powdered composition.

The composition was then blended with polyvinyl chloride having a polymerization degree of 1300 in the various proportions listed in below Table 2, together with 3 parts by weight of tribasic lead, 0.5 part by weight of lead stearate, 1 part by weight of barium stearate, and 0.5 part by weight of calcium stearate per 100 parts by weight of the polyvinyl chloride as in the manner described in Example 1. In like manner a sheet was formed. The properties of the sheet were measured with the results shown in below Table 2.

TABLE 2

| Experiment No. | 5 | 6 | 7 | 8 | 9 | 10 | 11 | 12 | 13 |
|---|---|---|---|---|---|---|---|---|---|
| Mixture of (A–3) and (B–1) in 7:3 | 100 | 90 | 80 | 70 | 60 | 50 | 40 | 20 | 0 |
| PVC | 0 | 10 | 20 | 30 | 40 | 50 | 60 | 80 | 100 |
| Izod impact value | 10.5 | 11.2 | 14.3 | 25.0 | 33.6 | 41.1 | 36.2 | 14.5 | 6.5 |
| Tensile strength (yield pt.) | 451 | 458 | 461 | 484 | 497 | 501 | 522 | 539 | 558 |
| Extensibility (breaking) | 10 | 13 | 17 | 21 | 23 | 28 | 37 | 67 | 74 |
| Heat distortion temp. (° C.) | 118 | 112 | 109 | 106 | 100 | 96 | 90 | 82 | 77 |
| Molding proper. | 1.5 | 2.0 | 4.4 | 4.4 | 4.3 | 4.6 | 4.7 | 6.8 | 9.9 |

NOTE.—Measurements were performed in the manner described in Table 1, with use of the same units for each test.

From the above Table 2, it is clear that the samples of Experiments 7–11 of the final thermoplastic resinous compositions are excellent in mechanical properties when compared with the control samples of Experiments 5, 6, 12 and 13. Also to be noted is the especially high impact strength when the proportion of polyvinyl chloride is within the range of 30 to 50 parts by weight.

EXAMPLE 3

A graft polymer (B–2) was prepared by grafting a monomer mixture consisting of 24 parts by weight of styrene and 21 parts by weight of methyl methacrylate to 55 parts by weight of polybutadiene as in the manner described in Example 1.

A mixture of 24 g. of the graft copolymer (B–2), 40 g. of polyvinyl chloride having a polymerization degree of 1300, and 36 g. of powder resin (A–1) (prepared in Example 1) was blended in the proportion by weight of (A–1) : (B–2) = 6:4 and (A–1) + (B–2) : PVC = 6:4, together with 1.2 g. of tribasic lead, 0.2 g. of lead stearate, 0.4 g. of barium stearate, and 0.2 g. of calcium stearate, in the same manner as described in Example 1, to obtain the resinous composition of this invention.

A sheet was formed from the final in the manner as described in Example 1, and the properties were measured and are set forth in the below Table 3.

EXAMPLE 4

A powder form graft copolymer (B–3) was prepared in the same manner as described for the preparation of graft polymer (B–1) in Example 1, except that a large grain styrene-butadiene rubber latex (JSR 0561 made by Nippon Synthetic Rubber Co.) was used instead of polybutadiene.

A mixture of powder of resin (A-1) (prepared in Example 1), powder of graft polymer (B-3), and polyvinyl chloride having a polymerization degree of 1100 was blended in the proportion by weight of (A-1) : (B-3) = 5:5, and (A-1) + (B-3) : PVC = 8:2, together in the same manner as described in Example 1, thereby to attain the resinous composition of this invention. The properties of a formed sheet were measured and are shown in below Table 3.

EXAMPLE 5

A graft polymer (B-4) was prepared in the same manner as described in the preparation of graft polymer (B-2) in Example 3, using instead a monomer mixture of 24 parts by weight of styrene, 15 parts by weight of methyl methacrylate, and 6 parts by weight of acrylonnitrile.

A mixture of powder resin (A-2) (prepared in Example 1), graft polymer (B-4) and polyvinyl chloride having a polymerization degree of 1300 was blended in the proportion by weight of (A-2) : (B-4) = 7:3, and (A-2) + (B-4) : PVC = 5:5, together in the same manner as described in Example 1 to obtain the resinous composition of this invention.

A sheet was formed from the resinous composition using the same procedure as described in Example 1, and subsequently the properties were measured with the results shown in below Table 3.

TABLE 3

|  | Example 3 | Example 4 | Example 5 |
| --- | --- | --- | --- |
| Resin (A) | A-1, 36g. | A-1, 40g. | A-2, 35 g. |
| Graft Polymer (B) | B-2, 24 g. | B-3, 40 g. | B-4, 15 g. |
| PVC (C) | 40 g. | 20 g. | 50 g. |
| Izod Impact value | 58.9 | 47.6 | 57.2 |
| Tensile Strength | 432 | 498 | 489 |
| Extensibility | 41 | 10 | 26 |
| Heat Distortion Temp | 99 | 97 | 94 |
| Molding Property | 6.4 | 8.3 | 7.7 |

Note: Measurements performed in the same manner as described in Table 1, with use of same units for each test.

Various modifications and extensions of this invention will become evident to those skilled in the art. All such modifications variations and deviations, which basically rely on the teachings through which this invention has advanced the art, are properly considered within the spirit and scope of this invention.

What is claimed is:

1. A thermoplastic resinous composition comprising a blend of:
    1. 20 to 60 parts by weight of a vinyl chloride homopolymer or copolymer with a monoolefinic comonomer, and
    2. 80 to 40 parts by weight of a resin blend consisting of
        A. 40 to 80 parts by weight of a resin prepared by copolymerizing a monomer mixture consisting of 30 to 80 percent by weight of alpha methylstyrene, 5 to 50 percent by weight of methyl methacrylate, and 3 to 30 percent by weight of acrylonitrile, and
        B. 60 to 20 parts by weight of a graft copolymer prepared by graft copolymerizing 35 to 65 percent by weight of a monomer mixture of 50 to 80 percent by weight of styrene, 20 to 50 percent by weight of methyl methacrylate and 0 to 30 percent by weight of acrylonitrile onto 65 to 35 percent by weight of a butadiene homopolymer or copolymer with a monoolefinic comonomer.

2. Composition according to claim 1, wherein said vinyl chloride homopolymer is polyvinyl chloride.

3. Composition according to claim 1, wherein said vinyl chloride copolymer comprises at least 50 percent by weight of vinyl chloride and said monoolefinic comonomer is selected from the group consisting of vinyl acetate, vinyl stearate, acrylic ester, methacrylic ester, styrene, acrylonitrile, ethylene and propylene.

4. Composition according to claim 1, wherein said resin (A) is prepared by emulsion polymerization.

5. Composition according to claim 1, wherein said butadiene homopolymer is polybutadiene.

6. Composition according to claim 1, wherein said butadiene copolymer comprises at least 50 percent by weight of butadiene and said monoolefinic comonomer is selected from the group consisting of styrene, acrylonitrile and methyl methacrylate.

7. Composition according to claim 1, wherein said butadiene homopolymer or copolymer is in latex form having more than 80 percent of the particles thereof are of grain size larger than 0.1 micron.

8. Composition according to claim 1, wherein the proportion of said vinyl chloride homopolymer or copolymer is 40 to 50 parts by weight of said composition.

* * * * *